United States Patent
Drummond Doig et al.

(10) Patent No.: US 11,551,181 B2
(45) Date of Patent: Jan. 10, 2023

(54) METHOD AND SYSTEM FOR INTERNET OF THINGS ASSET TRACKING WITHIN AN INTELLIGENT TRANSPORTATION SYSTEM

(71) Applicant: BlackBerry Limited, Waterloo (CA)

(72) Inventors: Ian Christopher Drummond Doig, Roquefort les Pins (FR); Stephen John Barrett, Haywards Heath (GB)

(73) Assignee: BlackBerry Limited, Waterloo (CA)

( * ) Notice: Subject to any disclaimer, the term of this patent is extended or adjusted under 35 U.S.C. 154(b) by 477 days.

(21) Appl. No.: 16/229,337

(22) Filed: Dec. 21, 2018

(65) Prior Publication Data

US 2020/0202292 A1 Jun. 25, 2020

(30) Foreign Application Priority Data

Dec. 20, 2018 (EP) .................................. 18214548

(51) Int. Cl.
| | | |
|---|---|---|
| G06Q 10/08 | (2012.01) | |
| H04W 4/44 | (2018.01) | |
| H04W 4/029 | (2018.01) | |
| G01S 5/00 | (2006.01) | |
| H04W 4/02 | (2018.01) | |

(52) U.S. Cl.
CPC ........ G06Q 10/0833 (2013.01); G01S 5/0027 (2013.01); H04W 4/027 (2013.01); H04W 4/029 (2018.02); H04W 4/44 (2018.02)

(58) Field of Classification Search
None
See application file for complete search history.

(56) References Cited

U.S. PATENT DOCUMENTS

| | | | |
|---|---|---|---|
| 9,587,951 B1 | 3/2017 | Hamida et al. | |
| 10,089,869 B1 * | 10/2018 | Makled | H04L 67/12 |
| 10,725,139 B1 * | 7/2020 | Duksta | G01S 5/0242 |
| 2005/0020307 A1 | 1/2005 | Parupudi et al. | |
| 2007/0018811 A1 | 1/2007 | Gollu | |
| 2010/0097208 A1 * | 4/2010 | Rosing | G06Q 50/30 |
| | | | 340/539.13 |
| 2011/0050423 A1 | 3/2011 | Cova et al. | |
| 2016/0260328 A1 * | 9/2016 | Mishra | G08G 1/166 |
| 2017/0242095 A1 * | 8/2017 | Schuh | G01S 5/0294 |
| 2017/0262668 A1 * | 9/2017 | Lim | E05B 67/003 |
| 2018/0087921 A1 * | 3/2018 | Suzuki | H04W 4/029 |
| 2018/0088339 A1 * | 3/2018 | Aruga | G02B 27/0172 |

(Continued)

FOREIGN PATENT DOCUMENTS

| | | |
|---|---|---|
| EP | 2348496 B1 | 3/2014 |
| WO | 2018/144187 | 8/2018 |
| WO | 2018/169590 | 9/2018 |

OTHER PUBLICATIONS

European Patent Office, extended European search report for application No. 18214548.2, dated Jun. 28, 2019.

(Continued)

*Primary Examiner* — Ernest G Tacsik
(74) *Attorney, Agent, or Firm* — Moffat & Co

(57) ABSTRACT

A method at an asset tracking device, the method including activating a receiver at the asset tracking device; obtaining an intelligent transportation system message using the receiver; determining a position from the intelligent transportation system message; and reporting the determined position to a remote server.

24 Claims, 10 Drawing Sheets

(56) References Cited

U.S. PATENT DOCUMENTS

2018/0368059 A1* 12/2018 Altintas ................ H04W 84/20
2019/0197860 A1*  6/2019 Cooper .............. A44B 13/0023
2019/0306680 A1* 10/2019 Doggart ................ H04L 67/18
2020/0207386 A1*  7/2020 Chan ..................... B61L 25/025

OTHER PUBLICATIONS

ETSI, "Intelligent Transport Systems (ITS); Vehicular Communications; Basic Set of Applications; Part 2: Specification of Cooperative Awareness Basic Service", EN 302 637-2, V1.3.1, Sep. 2014.
ETSI, "Intelligent Transport Systems (ITS); Users and applications requirements; Part 2: Applications and facilities layer common data dictionary", TS 102 894-2, V1.2.1, Sep. 2014.
ETSI, "Intelligent Transport Systems (ITS); Communications Architecture", EN 302 665, V1.1.1, Sep. 2010.
SAE, "Dedicated Short Range Communications (DSRC) Message Set Dictionary", J2735, Mar. 2016.

* cited by examiner

METHOD AND SYSTEM FOR INTERNET OF THINGS ASSET TRACKING WITHIN AN INTELLIGENT TRANSPORTATION SYSTEM

FIELD OF THE DISCLOSURE

The present disclosure relates to asset tracking, and in particular relates to location information for asset tracking.

BACKGROUND

Asset tracking is utilized in many areas and generally is used to find the location, among other attributes, of an asset. As used herein, an asset may be any product or container which may have a tag or similar computing device affixed thereto in order to track the asset. Examples may include a shipping container within the transportation industry, medical equipment within a hospital setting, emergency personnel or equipment for emergency settings, among other options.

Typically, asset tracking involves obtaining a location of a tracked asset. Such a location may be found in various ways, but one common way is to utilize a Global Navigation Satellite System (GNSS) such as a Global Positioning System (GPS). GNSS uses a constellation of satellites and, to obtain a position fix, an asset needs to find a signal from a plurality of the satellites.

However, if a tag or computing device associated with an asset is a low power device, such as a battery-operated device, the tag or asset will typically be in a sleep mode and will need to wake up occasionally to obtain a position fix. In this regard, the tag or computing device will need to lock to the plurality of satellite signals once it is woken up. Locking to satellite signals may be time consuming and battery intensive. Further, if the asset is in a location that is adverse to obtaining a GNSS position, such as within a city with tall buildings in which a "canyon" effect may obscure satellites, the GNSS position fix may not be obtainable and the asset tag or computing device may waste significant power attempting to obtain the position fix.

BRIEF DESCRIPTION OF THE DRAWINGS

The present disclosure will be better understood with reference to the drawings, in which.

DETAILED DESCRIPTION OF THE DRAWINGS

The present disclosure provides a method at an asset tracking device, the method comprising: activating a receiver at the asset tracking device; obtaining an intelligent transportation system message using the receiver; determining a position from the intelligent transportation system message; and reporting the determined position to a remote server.

The present disclosure further provides an asset tracking device, the asset tracking device comprising: a processor; and a communications subsystem, wherein the asset tracking device is configured to: activate a receiver at the asset tracking device; obtain an intelligent transportation system message using the receiver; determine a position from the intelligent transportation system message; and report the determined position to a remote server.

The present disclosure further provides a computer readable medium for storing instruction code, which, when executed by a processor of an asset tracking device cause the asset tracking device to: activate a receiver at the asset tracking device; obtain an intelligent transportation system message using the receiver; determine a position from the intelligent transportation system message; and report the determined position to a remote server.

In accordance with the embodiments described below, power efficient methods and systems for obtaining position fixes for tracked assets are provided.

In the embodiments described below, the tracked asset described is a trailer which is connected to a tractor. However, this is merely provided for illustration and in other cases, the tracked asset may be any shipping container, including, but not limited to, railcars, trucks, automobiles, among others. Further, in other cases, the tracked asset may be a package, parcel, product, person, vehicle including but not limited to watercraft, aircraft, spacecraft, or land vehicles, carts, buggies, trolleys, equipment, among other assets.

Figure 1:
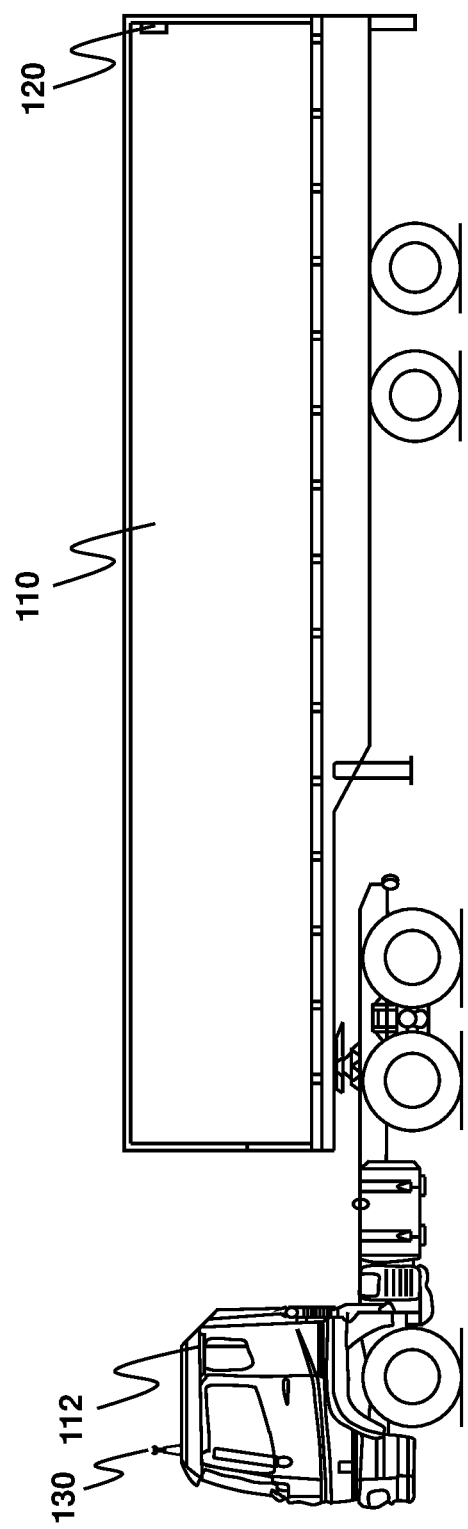
FIG. 1 is a side elevational view of a container showing an example placement of a sensor apparatus.

Reference is now made to FIG. 1. In the embodiment of FIG. 1, example truck 100 having a trailer 110 and cab 112 is shown. In one embodiment, a tag or computing device may be mounted on the back of the trailer. For example, in one embodiment the computing device may be mounted on the back door, or close to the top of the back door or on the rear side wall near the back door of the truck trailer 110. This is shown, for example, with asset tracking device 120 in the embodiment of FIG. 1.

The location of asset tracking device 120 near the rear of the trailer is however only one option for asset tracking. In other cases, it may be beneficial to have a different position for the asset tracking device. Further, in some embodiments it may be useful to have a plurality of such asset tracking devices within the trailer 110.

The asset tracking devices within trailer 110 may be used alone in some embodiments or may be combined into sets of two or more asset tracking devices and/or external sensors for asset tracking.

Apparatus

Figure 2:
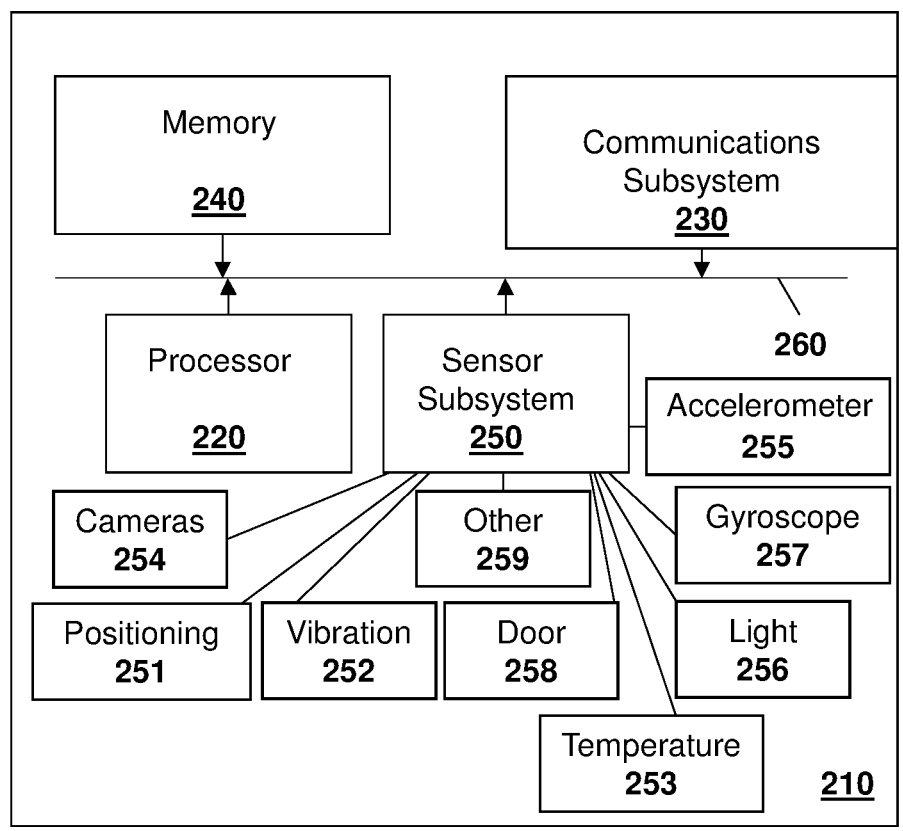
FIG. 2 is block diagram of an example sensor apparatus capable of being used between embodiments of the present disclosure.

One asset tracking device for a vehicle or container is shown with regard to FIG. 2. The asset tracking device of FIG. 2 is however merely an example and other sensing devices could equally be used in accordance with the embodiments of the present disclosure.

Reference is now made to FIG. 2, which shows an example asset tracking device 210. Asset tracking device 210 can be any computing device or network node. Such sensor apparatus or network node may include any type of electronic device, including but not limited to, mobile devices such as smartphones or cellular telephones. Examples can further include fixed or mobile devices, such as internet of things (IoT) devices, endpoints, home automation devices, medical equipment in hospital or home environments, inventory tracking devices, environmental monitoring devices, energy management devices, infrastructure management devices, vehicles or devices for vehicles, fixed electronic devices, among others.

Asset tracking device 210 comprises a processor 220 and at least one communications subsystem 230, where the processor 220 and communications subsystem 230 cooperate to perform the methods of the embodiments described herein. Communications subsystem 230 may, in some embodiments, comprise multiple subsystems, for example for different radio technologies.

Communications subsystem 230 allows asset tracking device 210 to communicate with other devices or network elements. Communications subsystem 230 may use one or more of a variety of communications types, including but not limited to cellular, satellite, Bluetooth™, Bluetooth™ Low Energy, Wi-Fi, wireless local area network (WLAN), sub-giga hertz radios, near field communications (NFC), IEEE 802.15, wired connections such as Ethernet or fiber, among other options.

As such, a communications subsystem 230 for wireless communications will typically have one or more receivers and transmitters, as well as associated components such as one or more antenna elements, local oscillators (LOs), and may include a processing module such as a digital signal processor (DSP) or System on Chip (SOC). As will be apparent to those skilled in the field of communications, the particular design of the communication subsystem 230 will be dependent upon the communication network or communication technology on which the sensor apparatus is intended to operate.

Processor 220 generally controls the overall operation of the asset tracking device 210 and is configured to execute programmable logic, which may be stored, along with data, using memory 240. Memory 240 can be any tangible, non-transitory computer readable storage medium, including DRAM, Flash, optical (e.g., CD, DVD, etc.), magnetic (e.g., tape), flash drive, hard drive, or other memory known in the art.

Alternatively, or in addition to memory 240, asset tracking device 210 may access data or programmable logic from an external storage medium (not shown), for example through communications subsystem 230.

In the embodiment of FIG. 2, asset tracking device 210 may utilize a plurality of sensors, which may either be part of asset tracking device 210 in some embodiments or may communicate with asset tracking device 210 in other embodiments. For internal sensors, processor 220 may receive input from a sensor subsystem 250.

Examples of sensors in the embodiment of FIG. 2 include a positioning sensor 251, a vibration sensor 252, a temperature sensor 253, one or more image sensors/cameras 254, accelerometer 255, light sensors 256, gyroscopic sensors 257, a door sensor 258, and other sensors 259. Other sensors may be any sensor that is capable of reading or obtaining data that may be useful for the asset tracking device 210. However, the sensors shown in the embodiment of FIG. 2 are merely examples, and in other embodiments, different sensors or a subset of sensors shown in FIG. 2 may be used. For example, in some cases the only sensor may be a position sensor.

For example, the position sensor may include a Global Navigation Satellite System (GNSS) receiver, for example a Global Positioning System (GPS) receiver (e.g. in the form of a chip or chipset) for receiving GNSS radio signals transmitted from one or more orbiting GNSS satellites. Although the present disclosure refers expressly to the Global Positioning System, it should be understood that this term and its abbreviation "GPS" are being used expansively to include any GNSS or satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system, among others.

Communications between the various elements of asset tracking device 210 may be through an internal bus 260 in one embodiment. However, other forms of communication are possible.

Asset tracking device 210 may be affixed to any fixed or portable platform. For example, asset tracking device 210 may be affixed to shipping containers or truck trailers in one embodiment, as for example described above with regard to FIG. 1.

In other cases, asset tracking device 210 may be part of a container that could be carried on or within a vehicle. In accordance with the present disclosure, the term container may include any sort of cargo or item transportation such as vehicles, intermodal containers, shipping bins, lock boxes, and other similar vessels.

Such an asset tracking device 210 may be a power limited device. For example, asset tracking device 210 could be a battery-operated device that can be affixed to a shipping container or trailer in some embodiments. Other limited power sources could include any limited power supply, such as a small generator or dynamo, a fuel cell, solar power, energy harvesting, among other options.

In other embodiments, asset tracking device 210 may utilize external power, for example from the battery or power system of a tractor pulling the trailer, via a wiring harness connected to a 7-pin plug, from a land power source for example on a plugged in recreational vehicle or from a building power supply, among other options. Thus, the asset tracking device 210 may also be connected to a power cord that receives its power from a power source.

External power may further allow for recharging of batteries to allow the asset tracking device 210 to then operate in a power limited mode again. Recharging methods may also include other power sources, such as, but not limited to, solar, electromagnetic, acoustic or vibration charging.

The asset tracking device from FIG. 2 may be used in a variety of environments. One example environment in which the asset tracking device may be used is shown with regard to FIG. 3.

Figure 3:
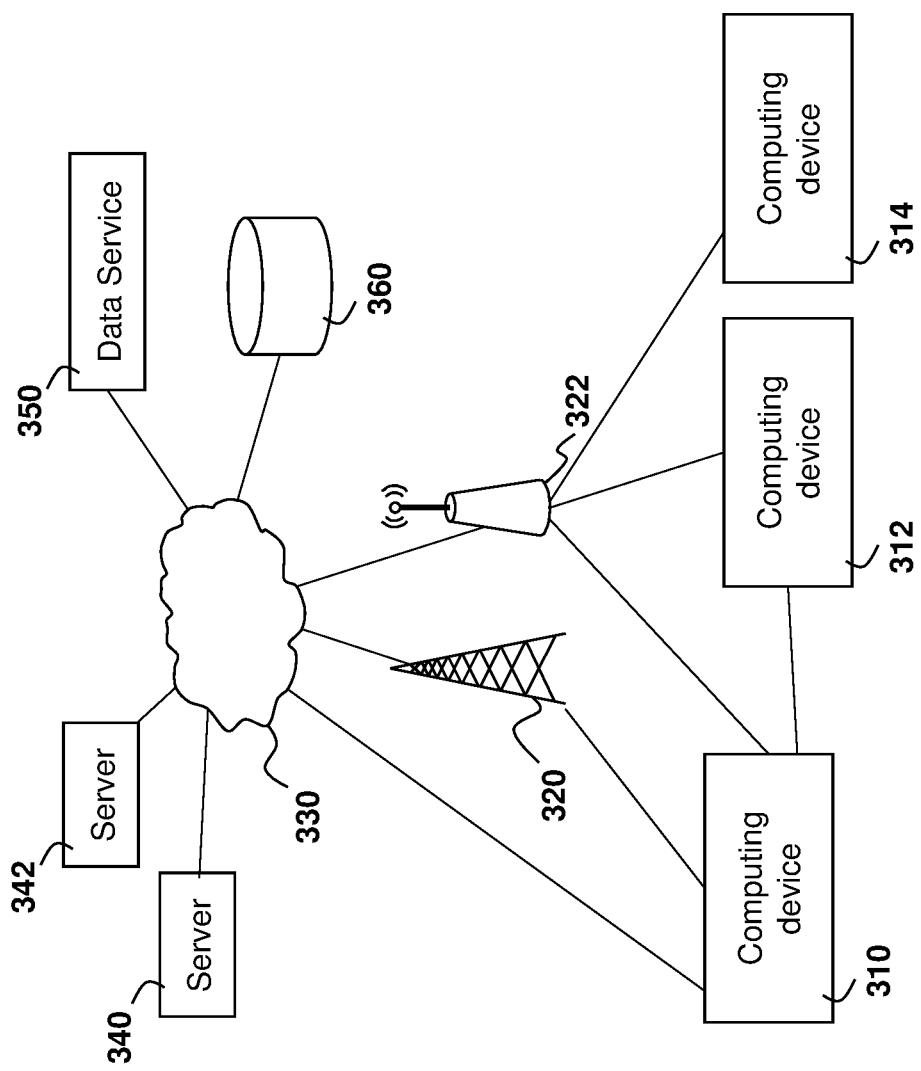
FIG. 3 is a block diagram showing an example environment for the sensor apparatus of FIG. 2.

Referring to FIG. 3, three asset tracking devices, namely asset tracking device 310, asset tracking device 312, and asset tracking device 314 are provided.

In the example of FIG. 3, asset tracking device 310 may communicate through a cellular base station 320 or through an access point 322. Access point 322 may be any wireless communication access point, including, but not limited to a wireless access network such as WiFi.

Further, in some embodiments, asset tracking device 310 could communicate through a wired access point such as Ethernet or fiber, among other options.

The communication may then proceed over a wide area network such as Internet 330 and proceed to servers 340 or 342.

Similarly, asset tracking device 312 and asset tracking device 314 may communicate with servers 340 or server 342 through one or both of the base station 320 or access point 322, among other options for such communication.

In other embodiments, any one of asset tracking devices 310, 312 or 314 may communicate through satellite communication technology. This, for example, may be useful if the asset tracking device is travelling to areas that are outside of cellular coverage or access point coverage.

In other embodiments, asset tracking device 312 may be out of range of access point 322 and may communicate with asset tracking device 310 to allow asset tracking device 310 to act as a relay for communications.

Communication between asset tracking device 310 and server 340 may be one directional or bidirectional. Thus, in one embodiment asset tracking device 310 may provide information to server 340 but server 340 does not respond. In other cases, server 340 may issue commands to asset tracking device 310 but data may be stored internally on asset tracking device 310 until the asset tracking device arrives at a particular location, possibly during a particular time window. In other cases, two-way communication may exist between asset tracking device 310 and server 340.

A server, central server, processing service, endpoint, Uniform Resource Identifier (URI), Uniform Resource Locator (URL), back-end, and/or processing system may be used interchangeably in the descriptions herein. The server functionality typically represents data processing/reporting that are not closely tied to the location of asset tracking devices 310, 312, 314, etc. For example, the server may be located essentially anywhere so long as it has network access to communicate with asset tracking devices 310, 312, 314, etc.

Server 340 may, for example, be a fleet management centralized monitoring station. In this case, server 340 may receive information from an asset tracking device associated with various trailers or cargo containers, providing information such as the location of such cargo containers, the temperature within such cargo containers, any unusual events including sudden decelerations, temperature warnings when the temperature is either too high or too low, cargo loading within the trailer, the mass of the trailer, among other data. The server 340 may compile such information and store it for future reference.

Other examples of functionality for server 340 are possible.

In the embodiment of FIG. 3, servers 340 and 342 may further have access to third-party information or information from other servers within the network. For example, a data services provider 350 may provide information to server 340. Similarly, a data repository or database 360 may also provide information to server 340.

For example, data services provider 350 may be a subscription-based service used by server 340 to obtain current road and weather conditions or may be an inventory control system in some cases.

Data repository or database 360 may for example provide information such as image data associated with a particular location, aerial maps, detailed street maps, or other such information.

The types of information provided by data service provider 350 or the data repository or database 360 is not limited to the above examples and the information provided could be any data useful to server 340.

In some embodiments, information from data service provider 350 or the data repository from database 360 can be provided to one or more of asset tracking devices 310, 312, or 314 for processing at those asset tracking devices.

Intelligent Transportation System

Intelligent Transportation System (ITS) software and communication systems are designed to, for example, enhance road safety and road traffic efficiency. Such systems include vehicle to/from vehicle (V2V) communications, vehicle to/from infrastructure (V2I) communications, vehicle to/from network (V2N) communications, vehicle to/from the pedestrian or portable (V2P) communications, and vehicle to network to vehicle (V2N2V). The communications from a vehicle to/from any of the above may be generally referred to as V2X.

Further, other elements in a system may communicate with each other. Thus, systems may include portable to/from infrastructure (P2I) communications, infrastructure to infrastructure (I2I) communications, portable to portable (P2P) communications (also known as peer to peer communications), among others. As used herein, V2X thus includes any communication between an ITS station and another ITS station, where the station may be associated with a vehicle, road side unit, network element, pedestrian, cyclist, animal, among other options. For example, vehicles on a highway may communicate with each other, allowing a first vehicle to send a message to one or more other vehicles to indicate that it is braking, thereby allowing vehicles to follow each other more closely.

Communications between elements of an ITS may further allow for potential collision detection and allow a vehicle with such a device to take action to avoid a collision, such as braking or swerving. For example, an active safety system on a vehicle may take input from sensors such as cameras, RADAR, LIDAR, and V2X, and may act on them by steering or braking, overriding or augmenting the actions of the human driver or facilitating autonomous driving where a human is not involved at all. Another type of advanced driver assistance system (ADAS) is a passive safety system that provides warning signals to a human driver to take actions. Both active and passive safety ADAS systems may take input from V2X and ITS systems.

In other cases, fixed infrastructure may give an alert to approaching vehicles that they are about to enter a dangerous intersection or alert vehicles to other vehicles or pedestrians approaching the intersection. This alert can include the state of signals at the intersection (signal phase and timing (SPaT)) as well as position of vehicles or pedestrians or hazards in the intersection. Other examples of ITS communications would be known to those skilled in the art.

Figure 4:
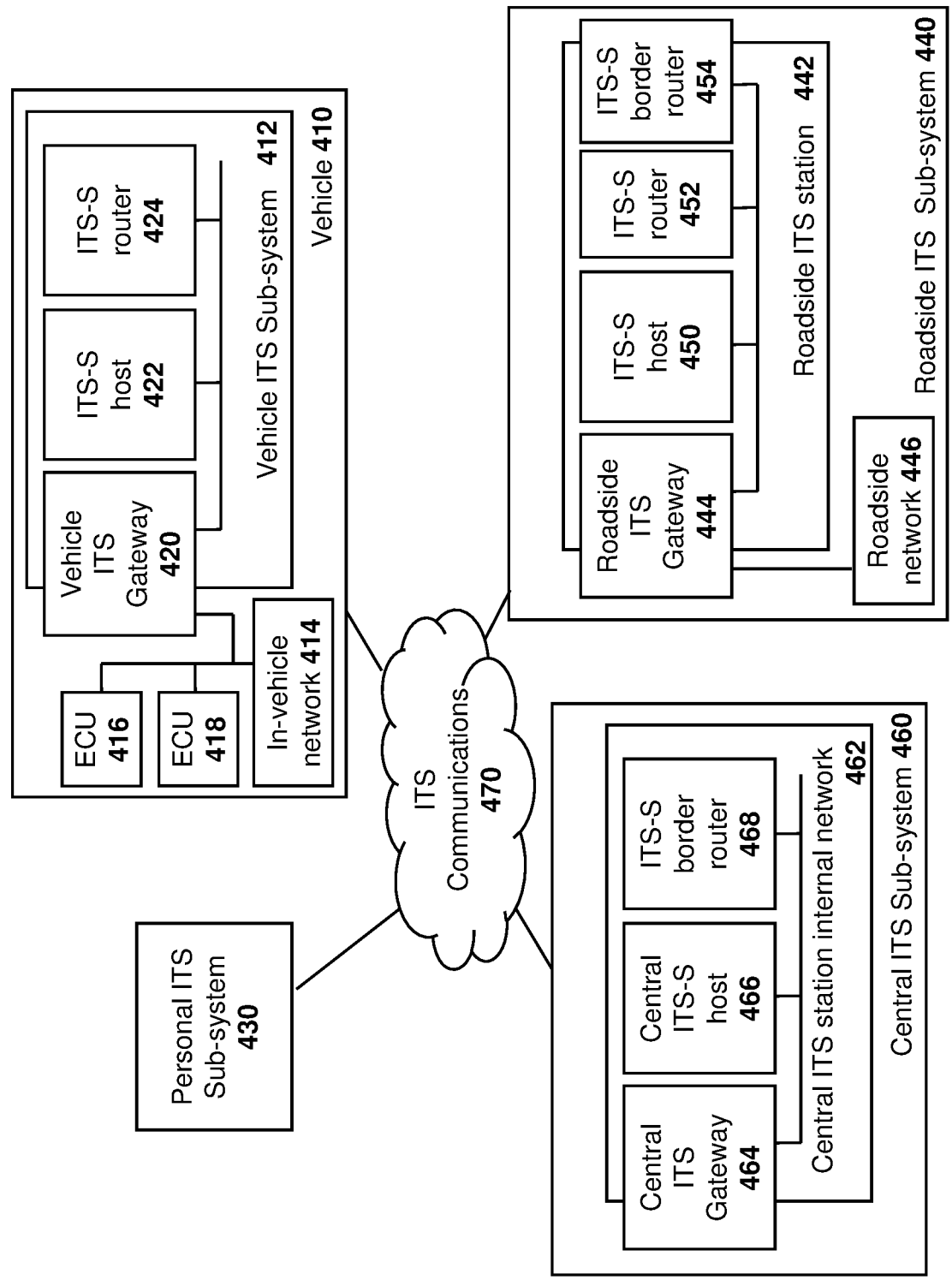
FIG. 4 is a block diagram showing an example intelligent transportation system (ITS) architecture.

Reference is now made to FIG. 4, which shows one example of an ITS station, as described in the European Telecommunications Standards Institute (ETSI) European Standard (EN) 302665, "Intelligent Transport Systems (ITS); communications architecture", as for example provided for in version 1.1.1, September 2010.

In the embodiment of FIG. 4, a vehicle 410 includes a vehicle ITS sub-system 412. For example, such subsystem may be found within cab 112 of a towing vehicle, as shown by reference numeral 130 in the embodiment of FIG. 1. Vehicle ITS sub-system 412 may, in some cases, communicate with an in-vehicle network 414. The in-vehicle network 414 may receive inputs from various electronic control unit (ECUs) 416 or 418 in the environment of FIG. 4.

Vehicle ITS sub-system 412 may include a vehicle ITS gateway 420 which provides functionality to connect to the in-vehicle network 414.

Vehicle ITS sub-system 412 may further have an ITS-S host 422 which contains ITS applications and functionality needed for such ITS applications.

Further, an ITS-S router 424 provides the functionality to interconnect different ITS protocol stacks, for example at layer 3. ITS-S router 424 may be capable of converting protocols, for example for the ITS-S host 422.

Further, the ITS system of FIG. 4 may include a personal ITS sub-system 430, which may provide application and communication functionalities of ITS communications (ITSC) in handheld or portable devices, such as personal digital assistants (PDAs), mobile phones, user equipment, among other such devices.

A further component of the ITS system shown in the example of FIG. 4 includes a roadside ITS sub-system 440, which may contain roadside ITS stations which may be deployed on bridges, traffic lights, among other options.

The roadside ITS sub-system 440 includes a roadside ITS station 442 which includes a roadside ITS gateway 444. Such gateway may connect the roadside ITS station 442 with one or more roadside networks 446.

A roadside ITS station 442 may further include an ITS-S host 450 which may contain ITS-S applications and the functionalities needed for such applications.

The roadside ITS station 442 may further include an ITS-S router 452, which provides the interconnection of different ITS protocol stacks, for example at layer 3.

The roadside ITS station 442 may further include an ITS-S border router 454, which may provide for one or both of the interconnection of two protocol stacks and the interconnection to an external network.

A further component of the ITS system in the example of FIG. 4 includes a central ITS sub-system 460 which includes a central ITS station internal network 462.

Central ITS station internal network 462 includes a central ITS gateway 464, a central ITS-S host 466 and a ITS-S border router 468. Central ITS gateway 464, central ITS-S host 466 and ITS-S border router 468 have similar functionality to the Roadside ITS gateway 444, ITS-S host 450 and ITS-S border router 454 of the roadside ITS station 442.

Communications between the various components may occur through an ITS peer-to-peer communications network or via network infrastructure 470.

From FIG. 4 above, V2X communications may be used for both road safety and for improving efficiency of road transportation, including movement of vehicles, reduced fuel consumption, among other factors.

V2X messages are defined by the European Telecommunications Standards Institute (ETSI) fall into two categories, namely Cooperative Awareness Message (CAM) and Decentralized Environmental Notification Message (DENM). A CAM message is a periodic, time triggered message that may provide status information to neighboring ITS stations. The broadcast is typically over a single hop and the status information may include a station type, position, speed, heading, among other options. Optional fields in a CAM message may include information to indicate whether the ITS station is associated with roadworks, rescue vehicles, or a vehicle transporting dangerous goods, among other such information.

Typically, a CAM message is transmitted between 1 and 10 times per second.

A DENM message is an event triggered message that is sent only when a trigger condition is met. For example, such trigger may be a road hazard or an abnormal traffic condition. A DENM message is broadcast to an assigned relevance area via geo-networking. It may be transported over several wireless hops and event information may include details about the causing event, detection time, event position, event speed, heading, among other factors. DENM messages may be sent, for example, up to 20 times per second over a duration of several seconds.

Similar concepts apply to the Dedicated Short Range Communications (DSRC)/Wireless Access In Vehicular Environments (WAVE) system in which a Basic Safety Message (BSM) is specified instead of the CAM/DENM messaging from ETSI.

For ETSI, the Cooperative Awareness basic service stores at least the following information for the CAM originated ITS-S operation: CAM generation time; ITS-S position as included in the CAM; ITS-S speed as included in the CAM; ITS-S heading as included in the CAM.

CAM messages that are received at an asset tracking device generally are in a particular format. For example, a CAM message includes a header, which is for example described in Appendix B.1 in ETSI EN 302 637-2 V1.3.1, September 2014. The B.1 header is described in Table 1 below.

TABLE 1

B.1 Header from ETSI EN 302 637-2

| | |
|---|---|
| Description | ITS Protocol Data Unit (PDU) header of the CAM. This DF includes DEs for the CAM protocolVersion, the CAM message type identifier messageID and the station identifier stationID of the originating ITS-S. The DE protocolVersion is used to select the appropriate protocol decoder at the receiving ITS-S. This DE messageID should be harmonized with other V2X message identifier definitions. |
| Data setting and presentation requirements | For the present document, the value of the DE protocolVersion shall be set to 1. For CAM, the DE messageID shall be set to cam(2). This DF shall be presented as specified in ETSI TS 102 894-2 ItsPduHeader. |

The station type is described in CAM messages in Appendix B.18, which is shown in Table 2 below.

TABLE 2

B.18 stationType from ETSI EN 302 637-2

| | |
|---|---|
| Description | Station type of the originating ITS-S. |
| Data setting and presentation requirements | The DE shall be presented as specified in ETSI TS 102 894-2 StationType. For vehicle ITS-Ss the value of this DE shall be set to one out of the values 3 to 10. |

The reference position is described in CAM messages in Appendix B.19, which is shown in Table 3 below.

TABLE 3

B.19 referencePosition from ETSI EN 302 637-2

| | |
|---|---|
| Description | Position and position accuracy measured at the reference point of the originating ITS-S. The measurement time shall correspond to generationDeltaTime. If the station type of the originating ITS-S is set to one out of the values 3 to 11 the reference point shall |

TABLE 3-continued

| B.19 referencePosition from ETSI EN 302 637-2 | |
|---|---|
| | be the ground position of the centre of the front side of the bounding box of the vehicle. The positionConfidenceEllipse provides the accuracy of the measured position with the 95% confidence level. Otherwise, the positionConfidenceEllipse shall be set to unavailable. If semiMajorOrientation is set to 0° North, then the semiMajorConfidence corresponds to the position accuracy in the North/South direction, while the semiMinorConfidence corresponds to the position accuracy in the East/West direction. This definition implies that the semiMajorConfidence might be smaller than the semiMinorConfidence. |
| Data setting and presentation requirements | The DE shall be presented as specified in ETSI TS 102 894-2 ReferencePosition. |

The heading of the sending vehicle found in CAM messages is described in Appendix B.21 and is shown in Table 4 below.

TABLE 4

| B.21 heading from ETSI EN 302 637-2 | |
|---|---|
| Description | Heading and heading accuracy of the vehicle movement of the originating ITS-S with regards to the true north. The heading accuracy provided in the DE headingConfidence value shall provide the accuracy of the measured vehicle heading with a confidence level of 95%. Otherwise, the value of the headingConfidence shall be set to unavailable. |
| Data setting and presentation requirements | The DE shall be presented as specified in ETSI TS 102 894-2 Heading. |

The speed of the sending vehicle found in CAM messages is described in Appendix B.22 and is shown in Table 5 below.

TABLE 5

| B.22 speed from ETSI EN 302 637-2 | |
|---|---|
| Description | Driving speed and speed accuracy of the originating ITS-S. The speed accuracy provided in the DE speedConfidence shall provide the accuracy of the speed value with a confidence level of 95%. Otherwise, the speedConfidence shall be set to unavailable. |
| Data setting and presentation requirements | The DE shall be presented as specified in ETSI TS 102 894-2 Speed. |

NOTE:
There might be a difference between the speed in moving direction and the driving speed.

The vehicle length of the sending vehicle is found in CAM messages and is described Appendix B.35, as shown in Table 6 below.

TABLE 6

| B.35 vehicleLength from ETSI EN 302 637-2 | |
|---|---|
| Description | This DF includes: vehicleLengthValue: Vehicle length of the vehicle ITS-S that originates the CAM. If there are vehicle attachments like a trailer, or overhanging attachments like a crane, that extend the vehicle length to the front and/or rear; then the vehicleLengthValue shall |

TABLE 6-continued

| B.35 vehicleLength from ETSI EN 302 637-2 | |
|---|---|
| | provide the length for the vehicle including the attachments. vehicleLengthConfidenceIndication: indication of whether trailer is detected to be present and whether the length of the trailer is known. |
| Data setting and presentation requirements | The DF shall be presented as specified in ETSI TS 102 894-2 VehicleLength. |

The vehicle width of the sending vehicle in CAM messages is described in Appendix B.35, as shown in Table 7 below.

TABLE 7

| B.36 vehicleWidth from ETSI EN 302 637-2 | |
|---|---|
| Description | Vehicle width, measured of the vehicle ITS-S that originates the CAM, including side mirrors. |
| Data setting and presentation requirements | The DE shall be presented as specified in ETSI TS 102 894-2 VehicleWidth. |

From Tables 1 to 7 above, various information with regard to a vehicle may be determined based on the CAM messages transmitted from such vehicle.

Further, from ETSI Technical Specification (TS) 102 894-2, "*Users and Application Requirements; Part Two: Applications and Facilities Layer, And Data Dictionary*", the A.78 DE_StationType is defined in accordance with Table 8.

TABLE 8

| A.78 DE_StationType from ETSI TS 102 894-2 | |
|---|---|
| Descriptive Name | StationType |
| Identifier | DataType_1 |
| ASN.1 representation | StationType ::= INTEGER {unknown(0), pedestrian(1), cyclist(2), moped(3), motorcycle(4), passengerCar(5), bus(6), lightTruck(7), heavyTruck(8), trailer(9), specialVehicles(10), tram(11), roadSideUnit(15)} (0 . . . 255) |
| Definition | The type of an ITS-S. The station type depends on the integration environment of ITS-S into vehicle, mobile devices or at infrastructure. Detailed definition of type is out of scope of the present document. The DE is used in RestrictedTypes DF as defined in clause A.125. |
| Unit | N/A |
| Category | Other information |

From Table 8 above, the type of station may be provided from which the CAM message originated.

Use of ITS Positioning in Asset Tracking

As provided above, GNSS location updates for IoT asset tracking devices may need the asset tracking device to use GPS or GNSS to obtain the location of the device on wake up. When an asset is mobile, such asset may be required to regularly report its location. Time spent by a receiver on searching for satellites and compiling accurate location information may drastically impact the power consumption, and hence the battery life, of the asset.

Location updates can take many tens of seconds to obtain a position fix in some cases and during this time power will be consumed. Further, in other cases a position fix may not be available or may not meet a required accuracy due to obstacles, canyon effects, or other events which may impair the ability to obtain a position fix.

Therefore, in accordance with the various embodiments of the present disclosure, solutions are provided where an asset tracking device that is associated with an ITS capable vehicle may utilize position information from the ITS messages to enhance or replace the need to obtain a position fixes through a GNSS system of the asset tracking device. The association with the ITS capable vehicle means the asset tracking device may be proximate or affixed to the vehicle.

Figure 5:
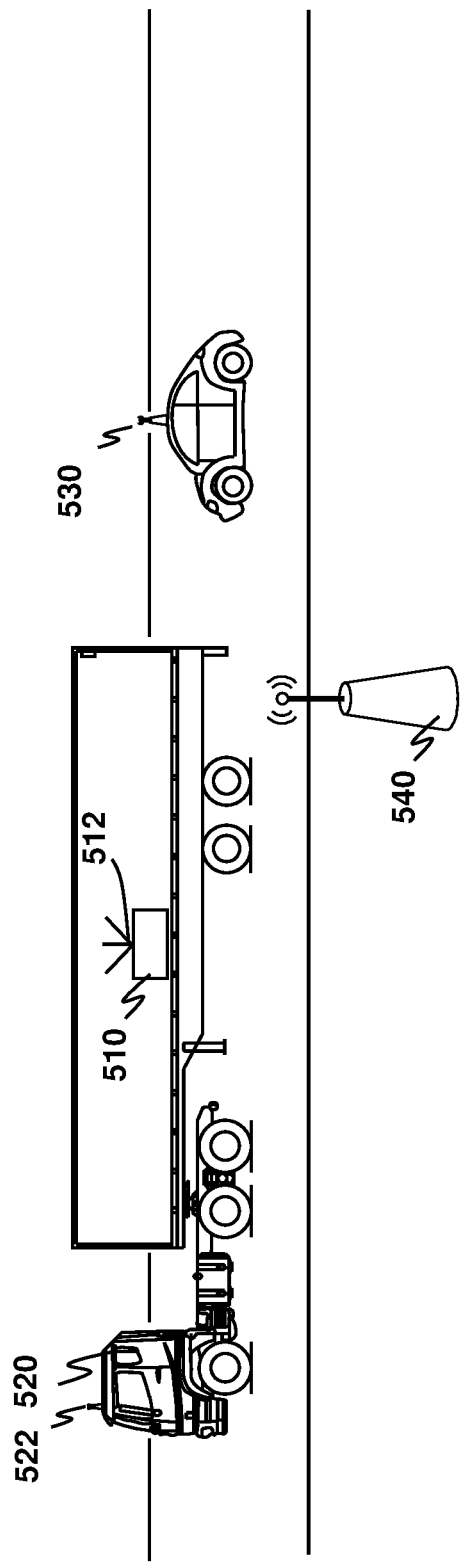
FIG. 5 is a block diagram showing an asset tracking device and surrounding ITS stations.

For example, reference is now made to FIG. 5. In the embodiment of FIG. 5, an asset 510 may have an asset tracking device 512 associated there with. In the example of FIG. 5, asset 510 is within a vehicle 520. For example, the asset tracking device 512 may be affixed to an asset within a trailer of a tractor trailer, or the asset tracking device may be affixed to the trailer or the asset tracking device 512 may be affixed to the vehicle. The asset being tracked may be something being carried within or by the trailer, may be the trailer itself, may be the trailer and its contents, may be the vehicle or may be the vehicle and its contents Vehicle 520 includes an ITS station 522 associated therewith. In the example of FIG. 5, an asset tracking device 512 on asset 510 may receive signals from the ITS station 522.

However, the asset tracking device 512 associated with asset 510 may further receive signals from a vehicle ITS station 530, where the vehicle is following vehicle 520 closely.

The asset tracking device 512 associated with asset 510 may further receive ITS signals from a roadside unit 540.

Strongest Signal

In accordance with one embodiment of the present disclosure, an asset tracking device may detect the message (e.g. BSM/CAM) which is received with the greatest power or with the minimum propagation loss and obtain a position from the transmitted message.

Figure 6:
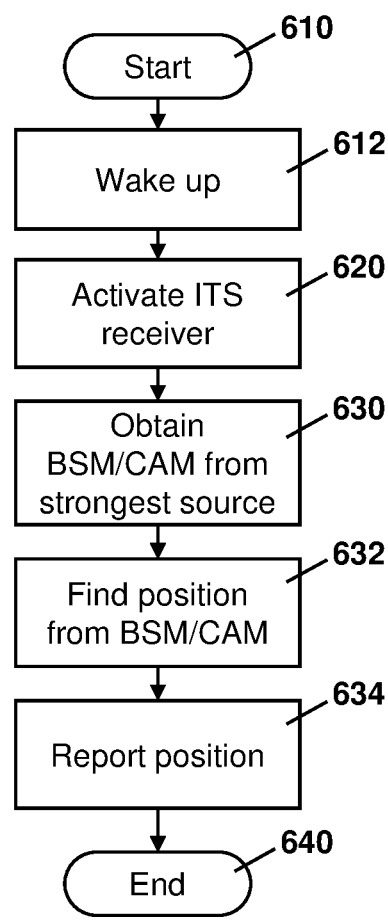
FIG. 6 is a process diagram showing a process for obtaining of a position from an ITS message.

In particular, reference is now made to FIG. 6. The process of FIG. 6 starts at block 610 and proceeds to block 612 in which the asset tracking device wakes up from a sleep state. In some cases, the wake up at block 612 may be precipitated by the detection of movement by the asset tracking device. However, in other cases, the wake up at block 612 may be scheduled, periodic, or at some other time.

The process then proceeds to block 620 in which the asset tracking device may then activate its ITS receiver.

The process then proceeds to block 630 in which the ITS receiver on the asset tracking device obtains an ITS message (for example a BSM/CAM) from the strongest source. In many cases, the strongest source may be from the vehicle that is associated with the asset tracking good device. However, in other cases, the strongest signal may be from a vehicle that is trailing the vehicle associated with the device, from a roadside unit, or from other devices.

In the embodiment of FIG. 6, the process then proceeds to block 632 in which the position may be obtained from the BSM/CAM message. The position may, for example, be obtained from the reference position field as provided in Table 3 above.

In some cases, in addition to the position, heading information, speed information, station type information, among other information may be obtained from the BSM/CAM message.

From block 632, the process proceeds to block 634 in which the asset tracking device may report the position obtained at block 632. In some cases, the report at block 632 may include information that the position was obtained from an external source and may have a location uncertainty. Further, in some cases the location uncertainty may be quantified to a value calculated at the asset tracking device.

For example, in some cases the signal strength of the BSM/CAM signal may be used in determining location uncertainty, where a stronger signal may indicate more certainty, and a weaker signal may indicate more uncertainty. However, other methods for determining certainty may also be used.

In other cases, the report at block 634 may include supplementary information such as of the certificate identifier for the ITS station that generated the of the BSM/CAM message. This may be derived, for example, from the header of the message as described in Table 1 above.

The attaching of the certificate identifier for the ITS station may allow a receiving entity, such as a server or asset tracking service, to correlate the certificate with the vehicle that is associated with the asset tracking device, as described in more detail below.

From block 634, the process proceeds to block 640 and ends.

From the embodiment of FIG. 6, the utilization of the ITS signal from an unknown source may give a position which is accurate within a defined area, for example 10 to 100 meters, which in some cases may be sufficient for an asset in transit.

Identification of the Vehicle Associated with the Asset Tracking Device

While the embodiment of FIG. 6 provides for location information from the strongest ITS signal, in some cases, the strongest ITS signal may come from a vehicle not associated with the asset tracking device. For example, this signal may be from a passing vehicle, roadside unit, trailing vehicle, among other options.

Knowing the vehicle associated with the asset tracking device can, in some cases, provide for enhancement in location accuracy. For example, it could place a limit on the maximum distance from the asset tracking device of the ITS Station which is generating the messages. Alternatively, an asset tracking device may determine, from the BSM/CAM message, a vehicle type, vehicle width, vehicle length, among other information, for the vehicle that the asset tracking device is associated with. When correlated with the heading information, the vehicle information can be used to supplement the location information to provide a more accurate position for the asset tracking device. Information about vehicle length or trailer length could be used to determine the absolute distance of the asset tracking device from the ITS station, whilst information on the heading of the vehicle could be used to determine the direction of the compass along which this absolute distance should be applied in determining the relative co-ordinates of the asset tracking device and the ITS station.

Figure 7:
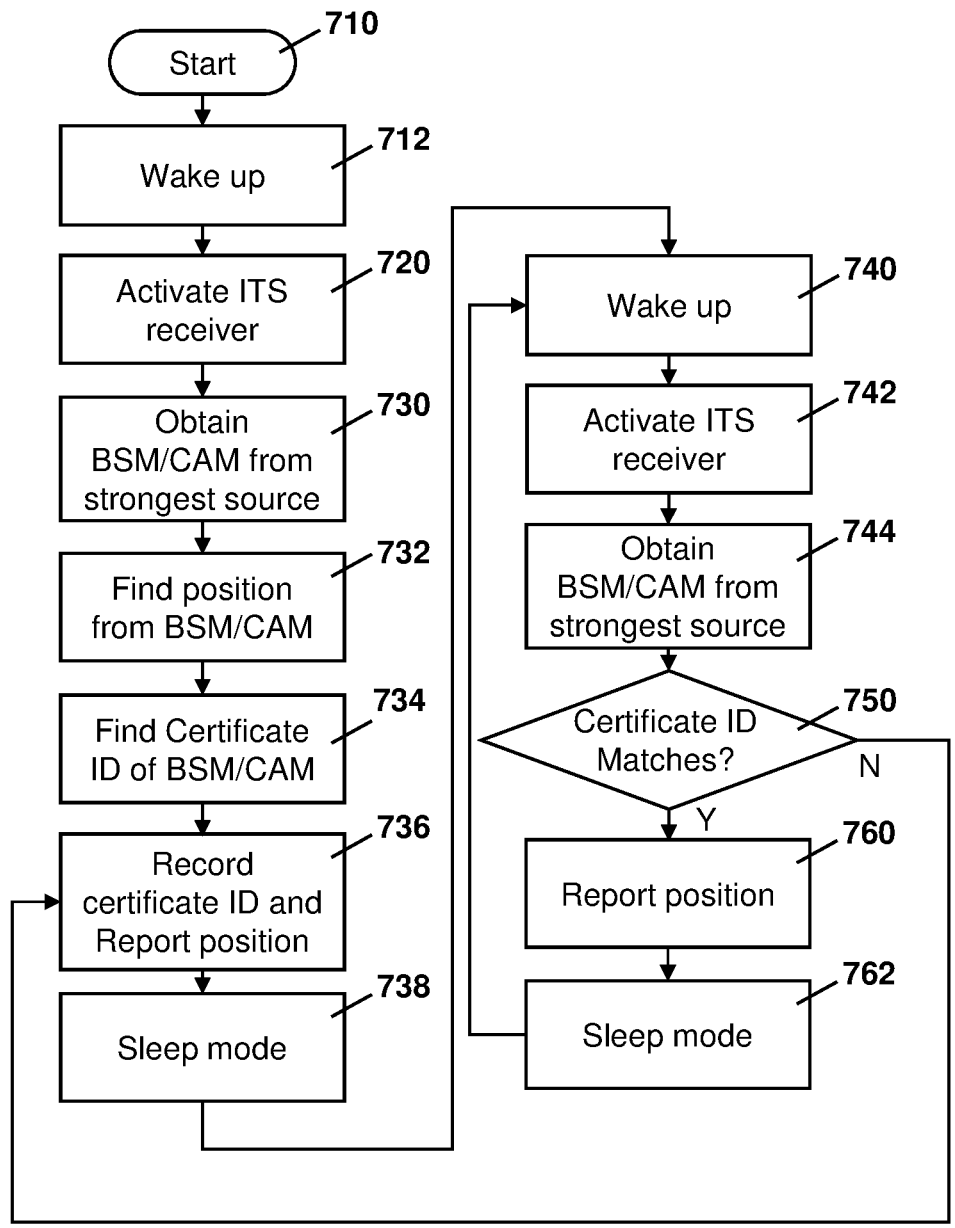
FIG. 7 is a process diagram showing a process for obtaining a position from an ITS message that has been associated with a particular vehicle.

Reference is now made to FIG. 7. In the embodiment of FIG. 7 the process starts at block 710 and proceeds to block 712 in which the asset tracking device may wake up.

The process then proceeds to block 720 in which the asset tracking device may activate its ITS receiver.

The process then proceeds to block 730 in which the BSM/CAM message is obtained from the strongest source.

From block 730, the process proceeds to block 732 in which the position is found from the BSM/CAM message. The position information may be supplemented by other information including speed and heading.

The process then proceeds to block 734 in which a certificate identifier for the BSM/CAM message is obtained.

Next, the process proceeds to block 736 in which the certificate identifier found at block 734 is stored at the asset tracking device. The process at block 736 further reports the position with an accuracy indicating some uncertainty in the location based on the fact that the position came from the strongest ITS signal.

From block 736, the process proceeds to block 738 in which the asset tracking device may again go into a sleep or battery saving mode.

The next scheduled wake up is shown at block 740, upon which the process proceeds to block 742 in which the asset tracking device may activate its ITS receiver.

From block 742, the process proceeds to block 744 in which the BSM/CAM message may be obtained from the strongest source.

From block 744, the process proceeds to block 750 in which the certificate identifier for the message obtained at block 744 is compared with the certificate identifier stored at block 736.

If, at block 750, the two certificate identifiers are found to match, then the process proceeds to block 760 in which a position is reported. The position reported at block 760 may have a higher level of confidence based on factors such as the vehicle length, heading, among other information extracted from the BSM/CAM message. This is because, as described above, this information can be used to apply a positioning correction to the position value provided in the CAM/DENM message. In particular, if the certificate identifiers match, this means that there is a stronger likelihood that the message is being obtained from the vehicle associated with the asset tracking device. Other information within the BSM/CAM message, including for example vehicle length and heading, might also be used to discard received messages that could not have been sent by a towing vehicle. This consistency check could be achieved by comparing such received information with that which is autonomously obtained by the asset tracking device through use of its own sensors.

In a variant to the embodiment of FIG. 7, at block 744 multiple BSM/CAM messages may be received from multiple sources and at block 750 a search made amongst these messages for the certificate identifier that has been received most frequently in the past, and which is therefore most likely to have been included in a message generated by a towing vehicle. At block 760 the position from this message which has the certificate identifier which was observed most frequently over the past can be extracted and reported, potentially with corrections applied as described above.

As used herein, a 'confidence level' may provide an indication about the accuracy attributable to the location of the asset. Confidence may be used similarly to that described in Tables 3 to 5 above. In those tables, location might be reported with the same 'confidence' say 95%, but what may change from report to report is the area of the ellipse around the reported position, for which there is the '95% confidence' /probability that the true location lies within that ellipse. Similar reporting for the location of the asset may be provided, in which a circle or ellipse may be provided around the asset to show an area that the asset is in with a 95% degree of confidence, when the size of the circle or ellipse could vary.

From block 760 the process proceeds to block 762 in which the asset tracking device may again enter a sleep mode.

From block 762 the process may proceed back to block 740 and continued to loop.

Conversely, if the certificate identifiers do not match, as found at block 750, the process may proceed back to block 736 in which the certificate identifier for the BSM/CAM message obtained at block 744 may be recorded and the position may be reported. In this case, the location may have a lower certainty value because the asset tracking device is uncertain whether the ITS signal is from the vehicle it is associated with.

The process may then continue to block 738 and further continue as described above.

As will be appreciated by those in the art, if the certificate identifier matches for more than two cycles, in some cases, this may further increase the certainty for the reporting at block 760. A running total of the number of consecutive matches for the certificate ID may be kept in some cases.

Further, in some embodiments, rather than using the strongest signal, the asset tracking device may choose any ITS signal it sees to find a position and report the position. In this case, the confidence level of the asset location may decrease, or may cause the circle or ellipse around the location to be larger, but then any signal could be used.

Further, in the embodiment of FIG. 7 and the other embodiments described herein, the asset tracking device may in some cases utilize its own sensors for comparison of heading in speed information with the BSM/CAM message to determine that the message has been sent from the correct ITS station. In this regard, the obtaining the BSM/CAM message at block 730 or 744 may further include filtering messages based on sensor information within the asset tracking device.

For example, in some cases, the obtaining of the BSM/CAM at blocks 730 and 744 may obtain multiple messages, for example the three or four BSM or CAM messages with the strongest signal. The process may then apply a filter to those messages. For example, in one case, a compass within the asset tracking device may indicate the heading for the asset tracking device. In this case, heading information within the three or four strongest BSM or CAM messages may be compared with the heading information derived at the asset tracking device, and those CAM messages indicating a vehicle travelling in a different direction may be filtered out.

In other cases, rather than a compass, the asset tracking device may filter out messages in which the acceleration is different or inconsistent. This may be achieved by use of an accelerometer sensor in the asset tracking device and by comparison of the acceleration computed using this sensor with the differential of velocity obtained from multiple V2X messages having the same certificate identifier.

In other cases, the asset tracking device may determine the certificate identifier of the towing vehicle by switching its GPS receiver on for a short time period and assessing whether one or more of position, heading, velocity or acceleration are consistent with the message being generated by a towing vehicle.

Multiple Certificates

In some cases, an ITS station may have a plurality of certificates. For example, the use of a plurality of certificates has been proposed in order to protect privacy and prevent an ITS station from being tracked. In this case, a vehicle may be pre-provisioned with a plurality of certificates, which may then be cycled through when providing ITS messages.

In order to help identify an ITS station associated with an asset tracking device, the asset tracking device may in some cases store a list of the certificate identifiers for the vehicle.

The list of certificate identifiers for the vehicle may, in some cases, be provisioned to the asset tracking device. In this case, the asset tracking device may receive and populate its list with the received information and may thereafter use this information to identify BSM/CAM messages from the vehicle associated with the asset tracking device.

In other cases, the asset tracking device may build a list of certificate identifiers observed over time and may then reference this list in determining from which message the position information will be obtained.

Figure 8:
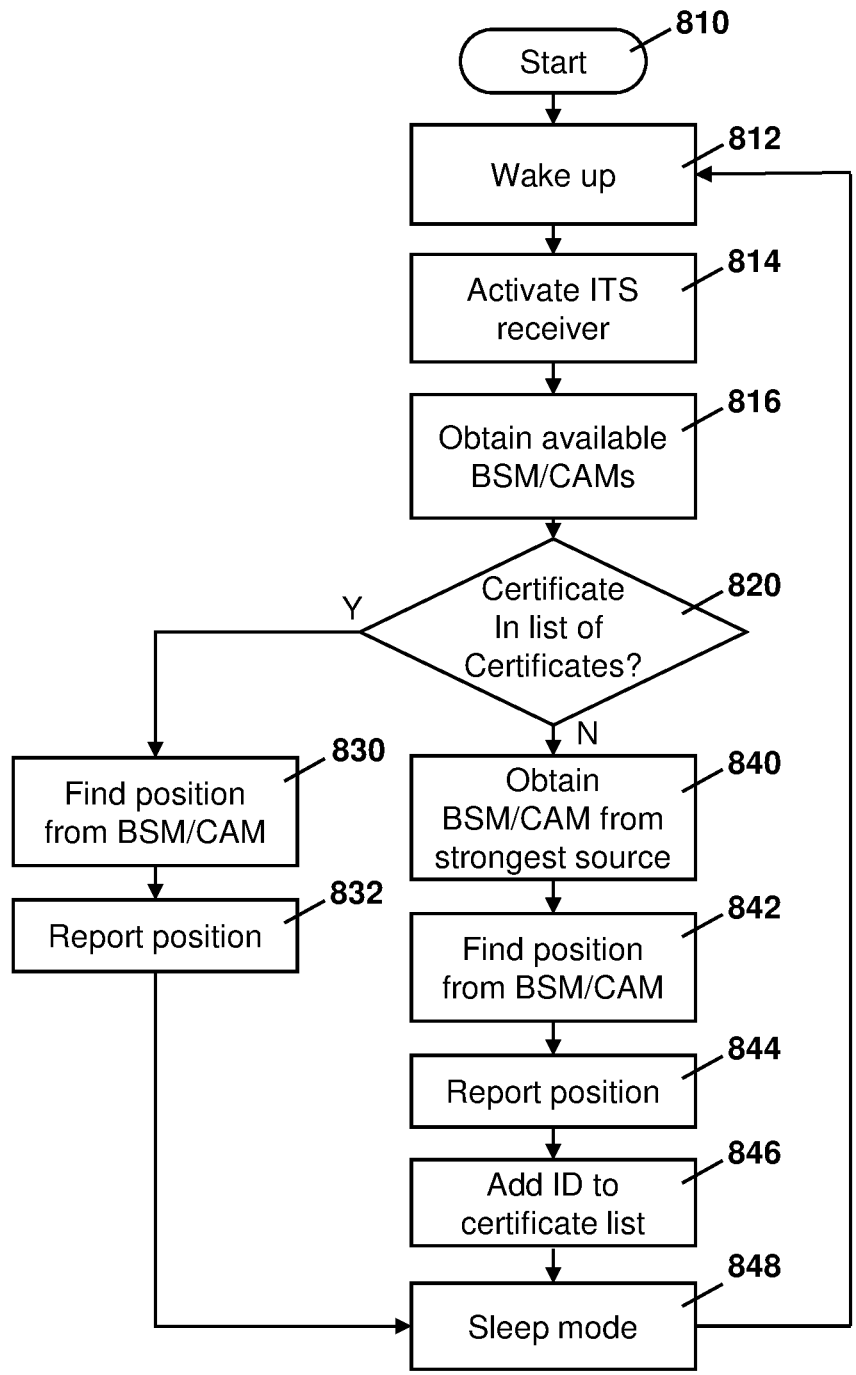
FIG. 8 is a process diagram showing a process for associating ITS messages with a plurality of certificate identifiers associated with a vehicle.

Reference is now made to FIG. 8. The process of FIG. 8 starts at block 810 and proceeds to block 812 in which the asset tracking device may wake up.

The process then proceeds to block 814 in which the asset tracking device activates its ITS receiver.

The process then proceeds to block 816 in which the asset tracking device obtains available BSM/CAM messages.

At block 820, the asset tracking device may then compare the certificate identifiers in the received ITS BSM/CAM messages to the certificate identifiers in the list stored at the asset tracking device.

If any of the certificate identifiers matches a certificate identifier stored in a certificate identifier list, the process may proceed from block 820 to block 830 in which the matched message may be used to find the position within the BSM/CAM message. Other information such as vehicle length, direction, among other information may also be used to improve location accuracy at the asset tracking device. For example, a vehicle length and direction may be used to create an offset from the reported position of the ITS station by the length of the vehicle and in the direction opposite the direction the vehicle's travelling.

If multiple certificate identifiers extracted from the messages appear in the list then priority may be given to using the location in the message having a certificate identifier that appears in a pre-provisioned list of certificate identifiers, where this pre-provisioning may be provided by an asset tracking server that knows the association between towing vehicles and trailers and which also knows which certificate identifiers will be used by the towing vehicle. Similarly, if multiple certificate identifiers obtained within received messages appear in the list then priority may be given to using the location in the message having the certificate identifier that was recorded as being observed most frequently in the past.

The process then proceeds to block 832 in which the position that was determined at block 830 is reported. The confidence for the accuracy of the location may be higher in this case since the certificate identifier matched a certificate identifier on the list stored at the asset tracking device.

Conversely, if the certificate list does not contain any of the certificate identifiers from the message that was received at block 816, the process proceeds from block 820 to block 840. At block 840, the asset tracking device obtains the BSM/CAM from the strongest source.

The process then proceeds to block 842 in which the position is determined from this selected BSM/CAM message. Other information, such as a heading, vehicle length, or vehicle type may also be derived from the selected BSM/CAM message. The other information may then be used, as described above, to increase the accuracy of the asset position.

The process then proceeds to block 844 in which the position of the asset tracking devices reported. The position reported at block 844 may have a higher level of uncertainty since the certificate identifier was not found on the certificate identifier list.

The process then proceeds to block 846 in which the certificate identifier is added to the certificate identifier list. This step might not occur if the asset tracking server has pre-provisioned the asset tracking device with the a priori known set of certificate identifiers that will be used by the towing vehicle.

From block 846, the process proceeds to block 848 in which the asset tracking device may enter a sleep mode.

Further, after the position is reported at block 832, the process may proceed to block 848 in which the asset tracking device enters a sleep mode.

From block 848, the process may then, after a time duration, proceed back to block 812 in which the asset tracking device wakes up.

Utilizing the process of FIG. 8, over time a certificate identifier list may be created for certificates associated with the vehicle on which the asset tracking device is located.

The certificate identifier list may occasionally be purged to remove old records. For example, if a certificate identifier is not seen within a certain time period, the certificate identifier may be removed from the certificate identifier list.

GPS Assistance

In a further embodiment, the asset tracking device may activate its ITS receiver and receive a BSM/CAM message. For the initial wake up or the initial threshold number of wake ups, the asset tracking device may also switch its GPS receiver on and obtain a location, direction and/or speed using the GPS location.

The comparison of the position fix/direction/speed from the GPS location with the ITS message may be used for a variety of purposes. In one case, it may help to isolate the ITS station that is carrying the asset tracking device. The asset tracking device can improve degree of confidence that, or even infer that, messages containing a certain certificate identifier are produced by a towing vehicle if the absolute difference in distance between the GPS position of the asset tracking device and the position reported by the ITS station remains the same over multiple observation periods, or if the heading reported in the CAM/BSM message is the same as the heading that the asset tracking device records, or if the velocity reported in in the CAM/BSM message is the same as the velocity that the asset tracking device records, or if the station type in the CAM/BSM message corresponds to the expected station type of a towing vehicle where that expected station type is pre-stored in the asset tracking device. Confidence that the source of CAM/BSM messages with a given certificate identifier are coming from a towing vehicle, with the above methods, increases if the asset tracking device is moving or as the count of the number of times that the same correlations are observed increases.

In other cases, the asset tracking device may compare the position fix from the GPS receiver with the position found within the BSM/CAM message and create an offset for the position fix. This offset can be applied to correct the position obtained from future received CAM/BSM messages which are received when the GPS receiver is not activated.

Figure 9:
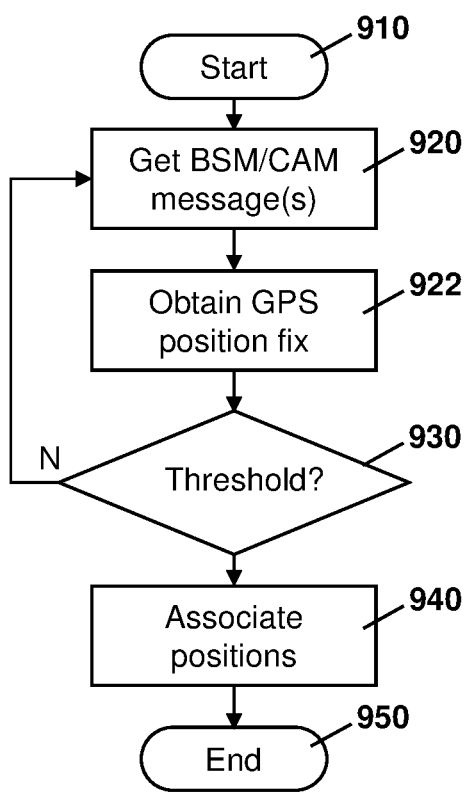
FIG. 9 is a process diagram showing a process for correlating a GPS fix with ITS messages.

Reference is now made to FIG. 9. The process of FIG. 9 starts at block 910 and proceeds to block 920 in which the BSM/CAM message(s) are received at the asset tracking device. In this case, the asset tracking device will wake up and turn on its ITS receiver prior to obtaining the BSM/CAM message.

From block 920 the process proceeds to block 922 in which a GPS or similar GNSS position fix is obtained.

The process then proceeds to block 930 in which a check is made to determine whether the threshold number of GPS or GNSS position fixes have been attained. If not, the process proceeds back to block 920 to continue to obtain BSM/CAM and GPS position fixes.

Once the threshold has been met at block 930, the process proceeds to block 940 in which the positions obtained at blocks 920 and 922 over the threshold number of iterations may be associated with each other. The association at block

940 may, for example, isolate the certificate identifier or identifiers for the vehicle associated with the asset tracking device. Further, the association at block 940 may create a position offset from the ITS transmitter.

The embodiment of FIG. 9 could be used with any of the embodiments of FIGS. 6 to 8 above.

Further, in some embodiments the asset tracking device may be associated with an asset that is not on a vehicle. For example, the asset tracking device may be affixed to a trailer that is in a trailer yard, to a package that is in a warehouse, among other options. In this case, a local road side unit or other similar device may be transmitting ITS signals. For example, a signal within the warehouse may be transmitted indicating a location.

In this case, the embodiment of FIG. 9 may be utilized to find the offset of the asset from the RSU. This may aid in finding the asset, for example by allowing an accurate position to be determined for the asset.

Battery savings would still be achieved. Specifically, after the initial position fix, the asset tracking device would then need to merely wake up and look for the BSM/CAM message to determine that the asset has not moved and therefore is in its previous location.

Further, in some cases, the GPS fix may be updated periodically. For example, once every 24 hours the GPS position fix may be updated to ensure that the asset has not moved within the trailer yard, warehouse or other asset location. Such timing is however only provided as an example, and other time durations may be used.

In still other cases, a GPS position fix may not be available. For example, in a warehouse, the GPS antenna may not be able to see satellites and therefore no position fix may be obtained. In this case, the location transmitted in the BSM/CAM message from the RSU may be reported to the asset tracking management system.

Correction of Location

In the embodiments of FIGS. 7 to 9 above, the location provided in the BSM/CAM message may be corrected based on other information, such as a GPS position fix, the length of the trailer and direction that the trailer is moving, among other such information. Such correction is described above, for example. In some cases, the correction may be made at the asset tracking device prior to reporting the location of the asset to the server or cloud service.

Further, in some cases, the asset tracking device may be preloaded with an offset or relative position to the paired ITS vehicle. The asset tracking device may then use to this preloaded offset to determine its location.

In other cases, the correction may be done at the server or cloud service. In particular, the asset tracking device may report the BSM/CAM message position and may provide the offset from the GPS position fix. Further, in some cases, the speed, direction or other information from the ITS messages may also be provided to the server or cloud service. In this case, the server or cloud service may utilize the received information to calculate the location of the asset tracking device.

In one case the asset tracking device may report to the server information obtained from multiple BSM/CAM messages, this information can include the certificate identifier, the position information, the heading, velocity, station type and vehicle dimensions. The server may use this information in combination with its own information to determine the position of the asset. In one method the asset tracking server may have the certificate identifiers of the vehicle that should be towing the asset, the server may also have the station type of the towing vehicle, the dimensions of the towing vehicle and the dimensions of the asset such as a trailer. The asset tracking server can use this information which it has to determine which of the CAM/BSM messages that it has been sent corresponds to the towing vehicle, for example because the certificate identifiers, station type or vehicle dimensions match. It can then take the position of the towing vehicle from the message corresponding to the towing vehicle and apply a correction, as for example described above, to it to determine the position of the asset.

The server or cloud service may for example be server 340, server 342 or other similar server is shown with regard to FIG. 3.

Based on the above, position fixes or location information for an asset tracking device may be supplemented with ITS message information in order to reduce power consumption or save battery life on the asset tracking device. The use of information from an ITS message allows the asset tracking device to reduce or eliminate the need to wake the GPS or GNSS receiver and obtaining a position fix in that way.

A server such as servers 340, 342 or 350 may be any network node. For example, one simplified server that may perform the embodiments described above is provided with regards to FIG. 10.

Figure 10:
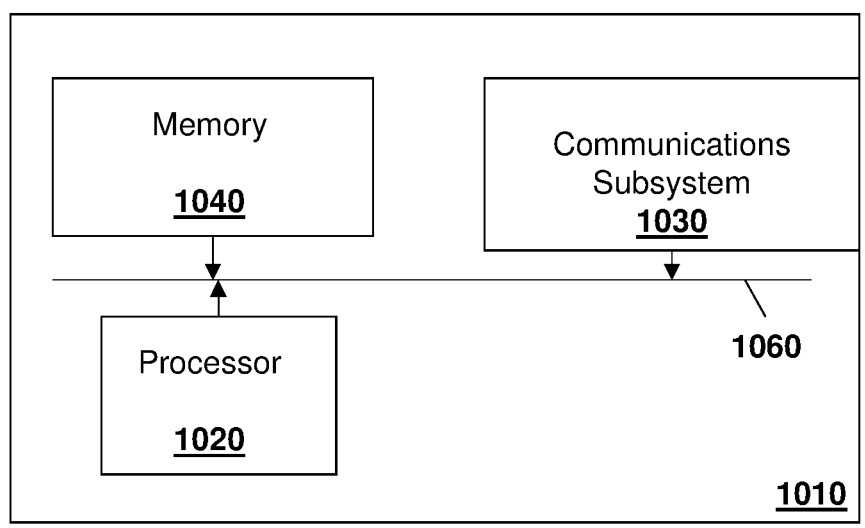
FIG. 10 is a block diagram of an example computing device or server capable of being used with the embodiments of the present disclosure.

In FIG. 10, server 1010 includes a processor 1020 and a communications subsystem 1030, where the processor 1020 and communications subsystem 1030 cooperate to perform the methods of the embodiments described herein.

The processor 1020 is configured to execute programmable logic, which may be stored, along with data, on the server 1010, and is shown in the example of FIG. 10 as memory 1040. The memory 1040 can be any tangible, non-transitory computer readable storage medium, such as DRAM, Flash, optical (e.g., CD, DVD, etc.), magnetic (e.g., tape), flash drive, hard drive, or other memory known in the art. In one embodiment, processor 1020 may also be implemented entirely in hardware and not require any stored program to execute logic functions.

Alternatively, or in addition to the memory 1040, the server 1010 may access data or programmable logic from an external storage medium, for example through the communications subsystem 1030.

The communications subsystem 1030 allows the server 1010 to communicate with other devices or network elements.

Communications between the various elements of the server 1010 may be through an internal bus 1060 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products. In some cases, functions may be performed entirely in hardware and such a solution may be the functional equivalent of a software solution.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide communication to an electronic device. For example, rather than a typical server response, the server may also provision or indicate data for a content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at an asset tracking device, the method comprising:
activating a receiver of an intelligent transportation system transceiver at the asset tracking device, the asset tracking device having the intelligent transportation system transceiver and a Global Navigation Satellite System (GNSS) transceiver;
obtaining a plurality of intelligent transportation system messages using the receiver, each intelligent transportation system message being at least one of a European Telecommunications Standards Institute (ETSI) Cooperative Awareness Message (CAM); an ETSI Decentralized Environmental Notification Message (DENM), and a Dedicated Short Range Communications (DSRC) Basic Safety Message (BSM);
filtering the plurality of intelligent transportation system messages to find an intelligent transportation message most relevant to the asset tracking device, the intelligent transportation system message providing a geographic position of a vehicle sending the intelligent transportation system message;
determining a geographic position of the asset tracking device from the intelligent transportation system message without waking up the GNSS transceiver; and
reporting the determined geographic position to a remote server.

2. The method of claim 1, wherein the reporting includes a confidence level with the determined position.

3. The method of claim 2, wherein the filtering comprises determining that an identifier within the intelligent transportation system message matches a stored identifier on the asset tracking device; and wherein the method further comprises increasing the confidence level of the determined position.

4. The method of claim 3, wherein the stored identifier is part of a list of identifiers stored at the asset tracking device.

5. The method of claim 4, wherein the list of stored identifiers is created by storing identifiers of a plurality of intelligent transportation system messages over time.

6. The method of claim 1, wherein the determining the position further comprises applying an offset from the geographic position of the vehicle sending the intelligent transportation system message.

7. The method of claim 6, wherein the asset tracking device is on a vehicle transmitting the intelligent transportation system message, and wherein the offset is based on a size of the vehicle and a direction of travel of the vehicle provided in the intelligent transportation system message.

8. The method of claim 6, further comprising:
activating the GNSS transceiver;
obtaining at least one position fix;
deriving an offset based on the at least one position fix and the geographic position of the vehicle sending the intelligent transportation system message; and
storing the offset.

9. The method of claim 1, wherein the obtaining the filtering comprises finding a message with a strongest signal strength.

10. The method of claim 1, wherein the reporting the geographic position comprises sending a geographic position, vehicle size and direction of travel found in the intelligent transportation system message to the remote server.

11. The method of claim 1, wherein the reporting the geographic position comprises information obtained from multiple intelligent transportation system messages, including one or more of a certificate identifier, position information, heading, velocity, station type and vehicle dimensions.

12. The method of claim 1, wherein the filtering comprises at least one of:
checking a direction of travel for the asset tracking and removing intelligent transportation messages from the plurality of intelligent transportation messages having a different direction of travel; or
checking a rate of acceleration for the asset tracking device and removing intelligent transportation messages from the plurality of intelligent transportation messages having an inconstant rate of acceleration.

13. An asset tracking device, the asset tracking device comprising:
a processor; and
a communications subsystem having an intelligent transportation system transceiver and a Global Navigation Satellite System transceiver, wherein the asset tracking device is configured to:
activate a receiver of the intelligent transportation system transceiver at the asset tracking device;
obtain a plurality of intelligent transportation system messages using the receiver, each intelligent transportation system message being at least one of a European Telecommunications Standards Institute (ETSI) Cooperative Awareness Message (CAM); an ETSI Decentralized Environmental Notification Message (DENM), and a Dedicated Short Range Communications (DSRC) Basic Safety Message (BSM);
filter the plurality of intelligent transportation system messages to find an intelligent transportation message most relevant to the asset tracking device, the intelligent transportation system message providing a geographic position of the vehicle sending the intelligent transportation system message;
determine a geographic position from the intelligent transportation system message without waking the GNSS transceiver; and
report the determined geographic position to a remote server.

14. The asset tracking device of claim 13, wherein the asset tracking device is configured to report by including a confidence level with the determined position.

15. The asset tracking device of claim 14, wherein the asset tracking device is further configured to filter by determining that an identifier within the intelligent transportation system message matches a stored identifier on the asset tracking device; the asset tracking device being further configured to increase the confidence level of the determined position.

16. The asset tracking device of claim 15, wherein the stored identifier is part of a list of identifiers stored at the asset tracking device.

17. The asset tracking device of claim 16, wherein the list of stored identifiers is created by storing identifiers of a plurality of intelligent transportation system messages over time.

18. The asset tracking device of claim 13, wherein the asset tracking device is configured to determine the geographic position by applying an offset from the geographic position of the vehicle sending the intelligent transportation system message.

19. The asset tracking device of claim 18, wherein the asset tracking device is on a vehicle transmitting the intelligent transportation system message, and wherein the offset is based on a size of the vehicle and a direction of travel of the vehicle provided in the intelligent transportation system message.

20. The asset tracking device of claim 18, wherein the asset tracking device is further configured to:
activate the GNSS transceiver;
obtain at least one position fix;
derive an offset based on the at least one position fix and the geographic position of the vehicle sending the intelligent transportation system message; and
store the offset.

21. The asset tracking device of claim 13, wherein the asset tracking device is configured to filter by finding a message with a strongest signal strength.

22. The asset tracking device of claim 13, wherein the asset tracking device is configured to report the position by sending a position, vehicle size and direction of travel found in the intelligent transportation system message to the remote server.

23. The asset tracking device of claim 13, wherein the asset tracking device is configured to report the geographic position by sending information obtained from multiple intelligent transportation system messages, including one or more of a certificate identifier, position information, heading, velocity, station type and vehicle dimensions.

24. A non-transitory computer readable medium for storing instruction code, which, when executed by a processor of an asset tracking device cause the asset tracking device to:
activate a receiver of an intelligent transportation system transceiver at the asset tracking device, the asset tracking device having the intelligent transportation system transceiver and a Global Navigation Satellite System transceiver;
obtain a plurality of intelligent transportation system messages using the receiver, each intelligent transportation system message being at least one of a European Telecommunications Standards Institute (ETSI) Cooperative Awareness Message (CAM); an ETSI Decentralized Environmental Notification Message (DENM), and a Dedicated Short Range Communications (DSRC) Basic Safety Message (BSM);
filter the plurality of intelligent transportation system messages to find an intelligent transportation message most relevant to the asset tracking device, the intelligent transportation system message providing a geographic position of the vehicle sending the intelligent transportation system message;
determine a geographic position from the intelligent transportation system message without waking the GNSS transceiver; and
report the determined geographic position to a remote server.

* * * * *